United States Patent [19]
Boswell

[11] 3,938,825
[45] Feb. 17, 1976

[54] VEHICLE SAFETY APPARATUS

[76] Inventor: George T. Boswell, 6710 Kenmont Place, Springfield, Va. 22151

[22] Filed: Dec. 14, 1973

[21] Appl. No.: 424,686

Related U.S. Application Data

[63] Continuation of Ser. No. 201,803, Nov. 24, 1971, abandoned.

[52] U.S. Cl. ............................................. 280/150 B
[51] Int. Cl. ................................................ B60r 21/10
[58] Field of Search .... 280/150 B, 150 SB, 150 AB; 180/91; 293/62, 84, 70, 86

[56] References Cited
UNITED STATES PATENTS

| | | | |
|---|---|---|---|
| 2,194,390 | 3/1940 | Hubbard | 180/91 |
| 2,873,994 | 2/1959 | Omps | 293/86 |
| 3,633,936 | 1/1972 | Huber | 280/150 B |

Primary Examiner—Robert R. Song

[57] ABSTRACT

Safety apparatus for a vehicle having a passenger seat, comprising an energy absorbing panel positioned in front of the seat and movably mounted on the vehicle for movement between a first position wherein the panel is spaced from the occupant of the seat and a second position wherein the panel is positioned closely adjacent to the upper torso of the occupant of the seat. A bumper is movably mounted on the vehicle and is connected to the energy absorbing panel so that movement of the bumper inwardly toward the vehicle in response to an impact thereon effects movement of the energy absorbing panel from the first to the second position wherein it restrains forward movement of the occupant of the seat.

13 Claims, 11 Drawing Figures

INVENTOR
GEORGE T. BOSWELL

BY

ATTORNEY

INVENTOR

GEORGE T. BOSWELL

BY

ATTORNEY

INVENTOR
GEORGE T. BOSWELL

BY

ATTORNEY

INVENTOR
GEORGE T. BOSWELL

BY

ATTORNEY

VEHICLE SAFETY APPARATUS

This is a continuation of application Ser. No. 201,803 filed Nov. 24, 1971, now abandoned.

BACKGROUND OF THE INVENTION

The continuing increase in automobile traffic throughout the world, while bringing with it many conveniences and advantages, has had the corollary results of producing an increasingly higher incidence of fatal accidents, particularly resulting from collisions between vehicles. While vehicles have been equipped with bumpers and other shock absorption devices designed to reduce the force of impact, they are still characterized by a marked inadequancy to solve the problem of fatalities and serious injuries resulting from collisions. This is well demonstrated by the fact that, despite the equipping of almost all passenger vehicles with bumpers or the like, vehicle collisions result, all too often, in fatal or serious injury to the driver and passengers.

While most vehicles at the present time are equipped with seat belts and/or shoulder harness belts, many drivers and passengers of vehicles do not use these belts owing to the inconvenience of fastening them or fear of entrapment. Inflatable devices, such as bags, are not being proposed for use in vehicles to restrain the forward movement of the driver and passenger in the event of a collision. Such inflatable devices, however, have limited usefulness depending on the impact angle; may not be completely reliable owing to the complicated systems for inflating them in response to an impact; are accompanied by a large amount of noise when inflated rapidly in response to an impact; and seat belts would still be necessary with such inflatable devices for high speed frontal impacts and for side and roll-over protection.

It will be readily seen, therefore, that a need has arisen for a reliable passive restraint system for protecting the driver and passengers of a vehicle in the event of a collision, which provides the safety features both of seat and shoulder harness belts without the inconvenience and action required of the occupants to effect the system's performance.

SUMMARY OF THE INVENTION

The present invention provides safety apparatus for a vehicle having a passenger seat, wherein an energy absorbing panel is positioned in front of the seat and is movably mounted on the vehicle for movement between a first position wherein the panel is spaced from the occupant of the seat and a second position wherein the panel is positioned closely adjacent to or in engagement with the upper torso of the occupant of the seat. A bumper is movably mounted on the front and/or sides of the vehicle and is connected to the energy absorbing panel so that movement of the bumper inwardly toward the vehicle in response to an impact thereon effects movement of the energy absorbing panel from the first to the second position wherein it restrains movement of the occupant of the seat.

The energy absorbing panel may be a portion of or may be mounted adjacent to the dashboard of the vehicle for the protection of the driver and front passengers of the vehicle. In the case of the rear passengers of the vehicle, one or more panels may be movable mounted adjacent the rear of the front seat of the vehicle for movement rearwardly into closely adjacent relation with the upper torso of the rear passengers to restrain their movement in the event of a collision. Preferably, the energy absorbing panels are formed of substantially rigid material and have a layer of energy absorbing material that faces the occupant of the vehicle seat when the panel is in its second position closely adjacent to the occupant.

In one embodiment, the inward movement of the movable bumper in response to an impact thereon effects rearward movement of a linkage connecting the bumper to the energy absorbing panel. The rearward movement of the linkage causes the panel to move rearwardly into the second position wherein it is closely adjacent to the occupant of the vehicle seat. In a second embodiment of the present invention, the inward movement of the bumper effects release of a linkage between the bumper and the energy absorbing panel, thereby allowing a spring or other resilient means to move the energy absorbing panel rearwardly to its second position wherein it restrains movement of the occupant of the vehicle seat.

For the purpose of allowing the occupant to leave the vehicle after a collision, a manually operable release mechanism is provided for effecting the movement of the energy absorbing panel from the second position to the first position wherein it is spaced forwardly of the occupant of the vehicle seat.

DESCRIPTION OF THE PREFERRED EMBODIMENTS

Figure 1:
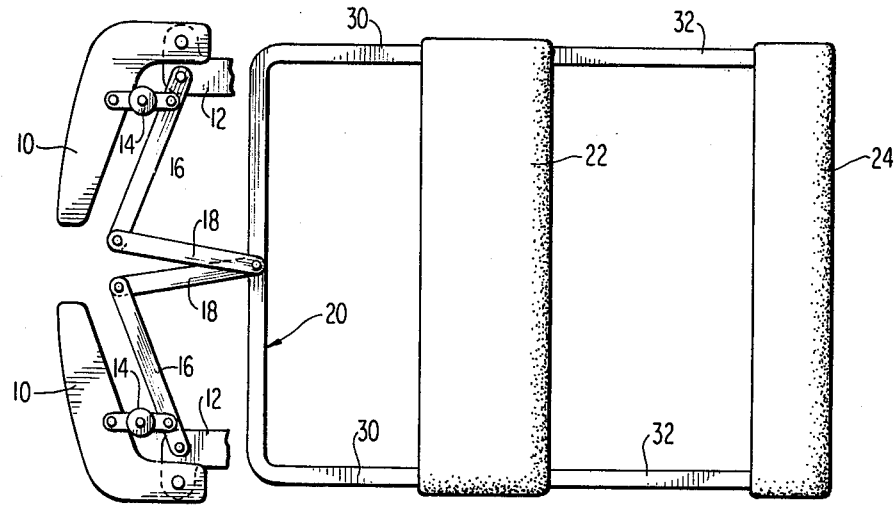
FIGS. 1 and 2 are schematic plan views of a first embodiment of vehicle safety apparatus constructed in accordance with the principles of the present invention, showing the safety apparatus in inoperative and operative positions, respectively.
Figure 2:
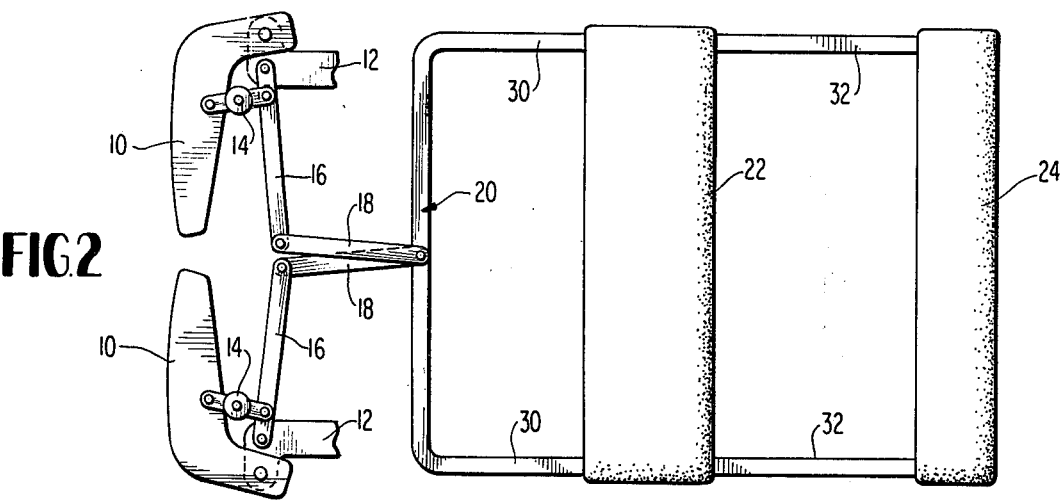
Figure 3:
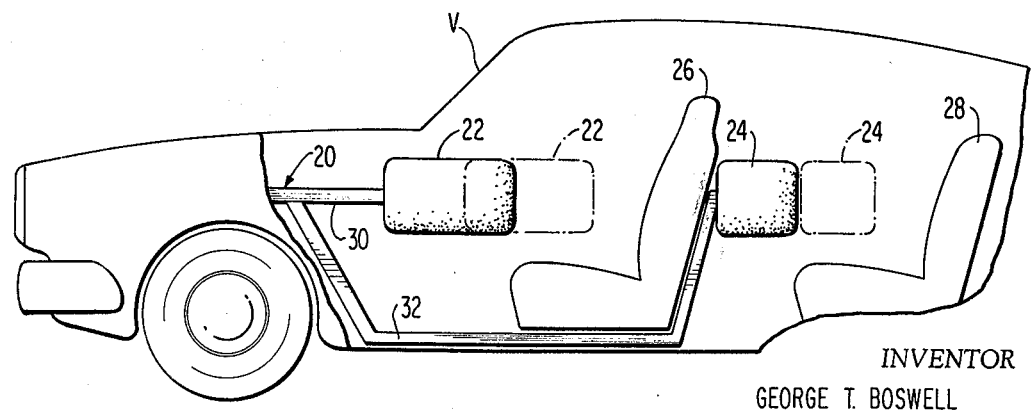
FIG. 3 is a schematic side elevational view of the safety apparatus shown in FIGS. 1 and 2 as incorporated in an automobile.

FIGS. 1 through 3 illustrate a first embodiment of the vehicle safety apparatus of the present invention. In this embodiment, front bumper segments 10 are pivotally mounted on the vehicle frame 12 in any suitable manner. The bumper segments 10 are connected, through spring or dashpot devices 14 of any suitable construction, to pairs of pivotally connected links 16 and 18. The links 16 are pivotally connected at one end to the vehicle frame 12 and at the other end to the adjacent link 18. Each of the links 18 is pivotally connected at a common point to a movable frame 20.

The movable frame 20 supports a laterally extending front panel 22 and a laterally extending rear panel 24. As shown in FIG. 3, the front panel 22 is positioned forwardly of the front vehicle seat 26, and the rear panel 24 is positioned forwardly of the rear seat 28. The frame 20 is provided with a first pair of rearwardly extending arms 30 for supporting the panel 22, and a second pair of rearwardly extending arms 32 for supporting the rear panel 24.

In operation, if one or both of the bumper segments 10 are moved inwardly in response to an impact thereon caused by a collision of the vehicle with another vehicle or with some other object, the links 16 and 18 are pivoted rearwardly to the position shown in FIG. 2, which results in corresponding rearward movement of the frame 20 and the panels 22, 24. The rearward movement of the panels 22 and 24 from the solid line to the broken line positions shown in FIG. 3, serves to restrain forward and other movement of the passengers in the front and rear seats 26 and 28, respectively. Preferably, the front and rear panels 22 and 24 are provided on their rear faces with a covering of an energy absorbing material, such as crushable plastic foam or the like, which will cushion and restrain the forward movement of the occupant of the front or rear seat in the event of a collision. Within the scope of the present invention, the linkages 14, 16, 18 may be of any suitable construction, and the frame 20 and panels 22 and 24 may be of any suitable size and shape. The front panel 22 may be formed in multiple sections and may also be formed as part of the dashboard for the vehicle V shown in FIG. 3. Since the bumper segments 10 are pivotally connected at their outer ends to the vehicle frame 12, and then bend inwardly toward the center of the vehicle V, side impacts on either of the bumper segments 10 will also result in rearward pivotal movement of the bumper segments and corresponding rearward movement of the links 16, 18 and the frame 20 to position the energy absorbing panels 22 and 24 closely adjacent the occupants of the front and rear seats 26 and 28, respectively. If the vehicle V is involved in a front end collision, therefore, the energy absorbing panels 22 and 24 will rapidly and automatically be moved rearwardly to the broken line positions shown in FIG. 3 wherein they will serve to cushion and restrain forward movement of the passengers and prevent them from being seriously injured as a result of the collision.

The extent of the rearward movement of the frame 20 and the energy absorbing panels 22 and 24 can be controlled in any suitable manner, such as by limiting the rearward movement of the bumper sections 10 or limiting the rearward movement of the frame 20 by using any suitable type of stop or other means (not shown). In the event of a high speed or severe collision of the vehicle V, the pivot points between the links 16, 18 and the frame 20 could be formed with one or more shear pins which would be constructed to break or shear-off in response to the application of a rearward force in excess of a predetermined force. In this manner, excessive rearward movement of the front and rear energy absorbing panels 22 and 24, which could be harmful to the occupant, would be prevented.

After a collision of the vehicle V has occurred, it would be possible for the occupant of the front or rear seat of the vehicle V to slide out of the vehicle V by lateral movement or, alternatively, to push the respective energy absorbing panel 22 or 24 forwardly, by disengaging the panel 22 or 24 from the frame 20 in any suitable manner so as to allow sufficient room for egress from the vehicle. The springs or dashpot devices 14 serve to bias the bumper segments 10 and the linkages 16, 18 to the position shown in FIG. 1, and could aid in the forward movement of the energy absorbing panels 22 and 24 after a collision.

Figure 4:
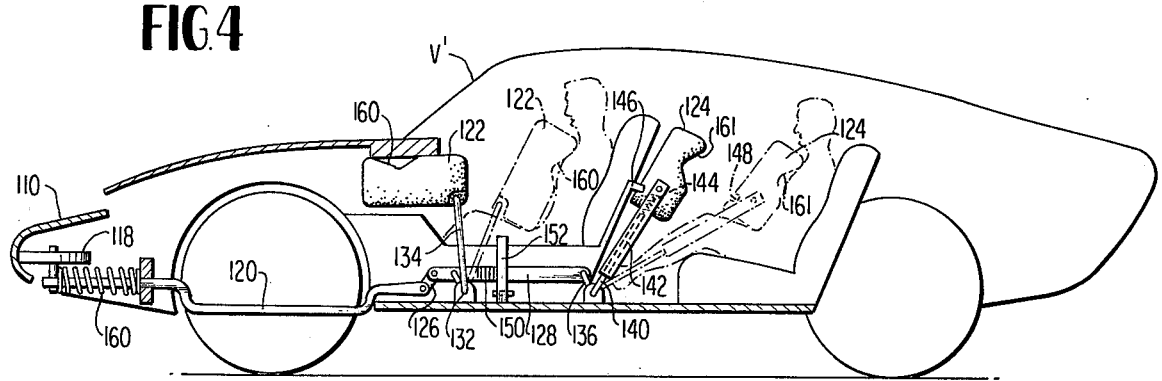
FIG. 4 is a side elevational view, with parts broken away, of a second embodiment of the vehicle safety apparatus of the present invention.
Figure 5:
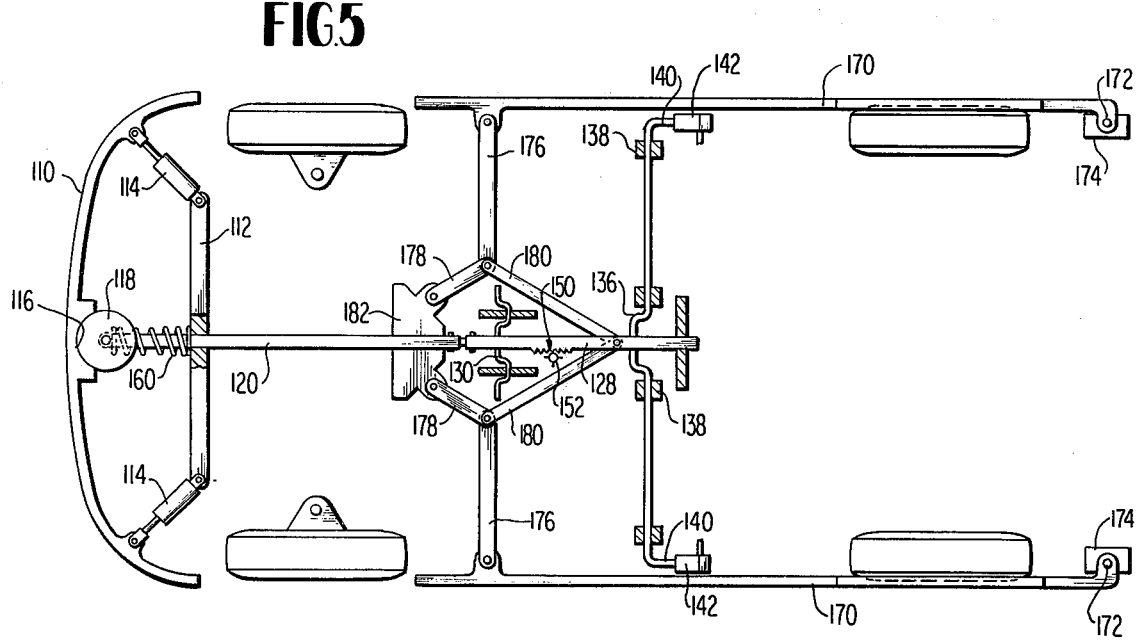
FIG. 5 is a plan view, with parts broken away, of the safety apparatus shown in FIG. 4.

FIGS. 4 and 5 disclose a second embodiment of the vehicle safety apparatus of the present invention wherein pivotally movable front and rear energy absorbing panels 122 and 124 are utilized. In this embodiment of the invention, the front bumper 110 of the vehicle V' preferably is formed in a one piece curved configuration, and is pivotally connected to the vehicle frame 112 by any suitable type of shock absorbing devices 114. At its center portion, the bumper 110 is provided with a rearwardly facing, curved cam slot 116 in which the front portion of a rotary cam member 118 is received. The cam member 118 is rotatably mounted on a first link 120 which extends rearwardly in the lower portion of the vehicle V'. The link 120 is connected by an over-travel coupling 126 of any suitable construction to a second link 128. A first bell crank lever 130 is pivotally connected to the second link 128 and is pivotally supported by the seat or vehicle frame at 132. The bell crank lever 130 comprises a pair of upwardly extending arms that are pivotally connected to a front energy absorbing panel 122 which is biased for rotation in a clockwise direction (as seen in FIG. 4) by any suitable type of spring means, such as a torsion spring (not shown). From the foregoing description, it will be readily seen that rearward movement of the first and second links 120 and 128 results in clockwise or rearward rotation of the bell crank lever 130 and its arms 134.

A second bell crank lever 136 is pivotally connected to the second link 128 and is pivotally supported on the seat or vehicle frame at positions 138. The second bell crank lever 136 comprises upwardly extending arms 140 that are in telescoping relation with elongated tubes 142 in which helical coil springs 144 are positioned for the purpose of urging the elongated tubes upwardly and outwardly as shown in FIG. 4. The upper ends of the tubes 142 are connected to the rear energy absorbing panel 124, and the tubes 142 are maintained in the stored position shown in FIG. 4 against the force of the springs 144 by the retaining bracket 146 that is received in a complementary slot 148 in the panel 124.

In the operation of the embodiment of the vehicle safety apparatus shown in FIGS. 4 and 5, a front impact on the bumper 110 will result in rearward movement of the bumper and corresponding rearward movement of the links 120 and 128. The rearward movement of the link 128 causes clockwise or rearward rotation of the bell crank lever 130 and the bell crank lever 136, which causes corresponding rearward rotation of the arms 134 and 142, and the energy absorbing panels 122 and 124, respectively. When the front energy absorbing panel 122 is moved rearwardly a sufficient distance, it clears the upper portion of the dashboard of the vehicle V' and the torsion spring (not shown) serves to rotate the panel 122 from the solid line position to the broken line position shown in FIG. 4, wherein the panel 122 is positioned closely adjacent the occupant of the front seat so as to restrain forward movement of the occupant during the collision.

In a similar manner, the rearward pivotal movement of the bell crank lever 136 and arms 140 causes the rear energy absorbing panel 124 to be released from the locking bracket 146, and thus the springs 144 move the elongated tubes 142 and the panel 124 to the extended position shown in broken lines in FIG. 4. In this position, the energy absorbing panel 124 serves to restrain forward movement of passengers in the rear seat of the vehicle V' during the collision and prevents fatal or serious injury to these passengers.

Preferably, a spring 160 is provided to bias the bell crank levers 130 and 136 in a forward or counter-clockwise direction (as seen in FIG. 4), and the second link 128 is provided with ratchet teeth 150 which are engaged by a detent arm 152 for the purpose of retaining the link 128 and the energy absorbing panels 122 and 124 in the rearward protective positions to which they have been moved in response to an impact on the bumper 110. The detent arm 152 preferably is pivotally mounted on the vehicle frame in any suitable manner and can be manually moved away from the ratchet teeth on the second link 128 by an occupant of the vehicle for the purpose of effecting the forward movement of the bell crank levers 130 and 136, and energy absorbing panels 122 and 124, so as to allow egress of the occupant from the vehicle.

The energy absorbing panels 122 and 124 may be formed in any suitable manner and of any suitable materials, and may be similar to panels 22 and 24 previously described herein and shown in FIGS. 1 through 3. As shown in FIG. 4, the panels 122 and 124 may be provided with recesses that face the occupant when they are disposed in their rearward protective positions. These recesses 160 and 161 are for the purpose of accommodating the head of a child or reducing the constraints on female occupants. Within the scope of the present invention, the energy absorbing panels 122 and 124 could be of any suitable configuration.

In the event of a side impact on the vehicle V' shown in FIGS. 4 and 5, side bumper sections 170 are provided which are pivotally connected at 172 to the vehicle frame portion 174. Each of the side bumper sections 170 is pivotally connected to a first link 176 which is in turn pivotally connected to second and third links 178 and 180. Each of the second links 178 is pivotally supported on a fixed portion of the vehicle 182, and the third links 180 are pivotally connected at a common point to the rearwardly extending link 128. Preferably, the rear ends of the links 180 are provided with elongated slots (not shown) at their common pivot point with the link 128 such that rearward movement of the link 128 in response to rearward front bumper movement will not require movement of the links 180.

In the event of an impact on one of the side bumpers 170, the respective side bumper is pivoted inwardly which results in inward movement of the first link 176 pivotally connected thereto, and rearward movement of the links 180 and the link 128. The rearward movement of the link 128 causes the clockwise or rearward rotation of the bell crank levers 130 and 136 and their arms 134 and 140, respectively, which results in movement of the energy absorbing panels 122 and 124 to their broken line protective positions shown in FIG. 4, as hereinbefore described.

In the embodiment of the present invention shown in FIGS. 4 and 5 therefore, it will be readily seen that the energy absorbing panels 122 and 124 will be moved into protective positions to restrain forward movement of the occupants of the front and rear seats in the event of an impact on the front bumper 110 or the side bumper sections 170.

Figure 6:
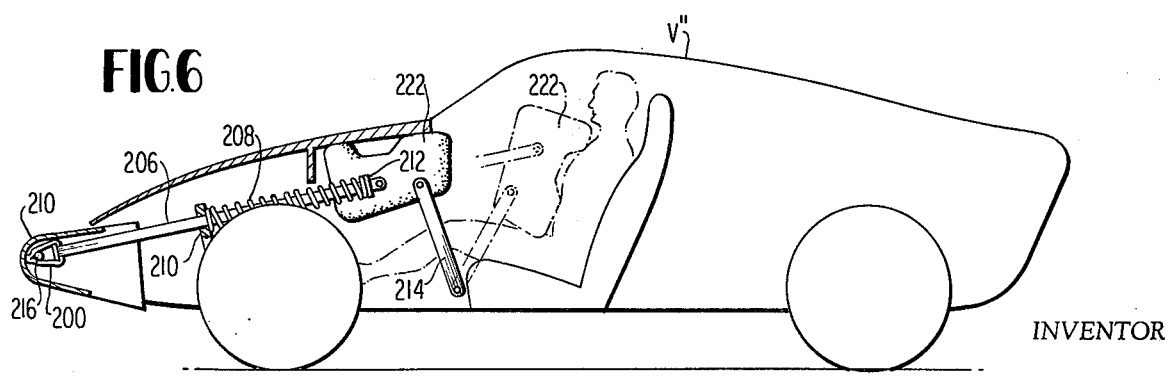
FIG. 6 is a side elevational view, with parts broken away, of a third embodiment of a vehicle safety apparatus of the present invention.
Figure 7:
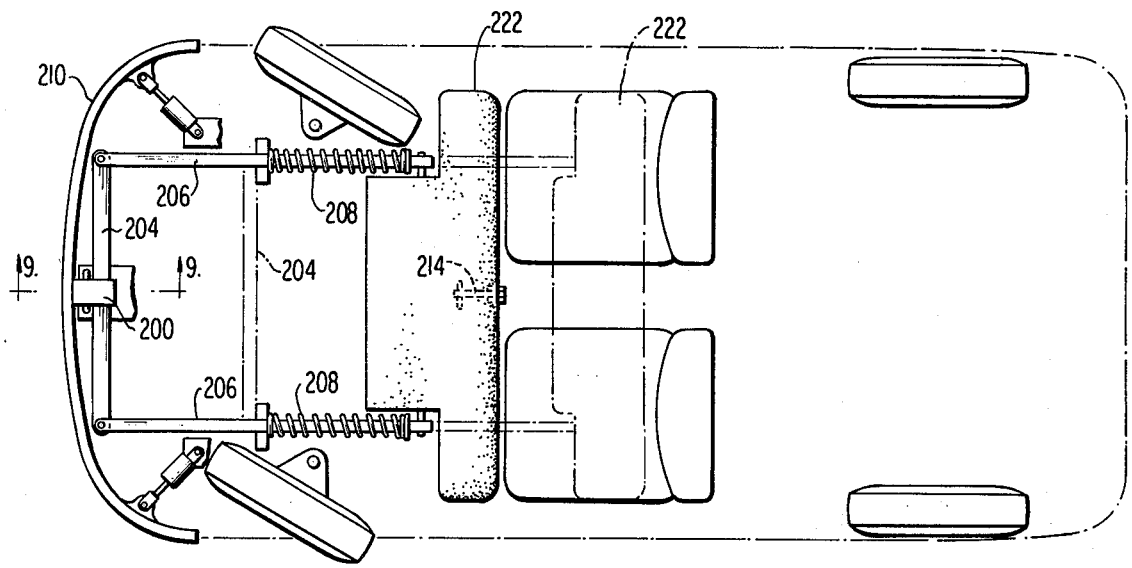
FIG. 7 is a plan view, with parts broken away, of the embodiment of the vehicle safety apparatus shown in FIG. 6.
Figure 9:
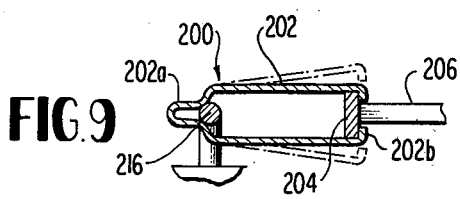
FIG. 9 is an enlarged elevational view, with parts broken away and partly in section, of an embodiment of the release mechanism utilized in the embodiments of the vehicle safety apparatus shown in FIGS. 6 and 7.

FIGS. 6 through 9 disclose further embodiments of the present invention wherein one or more spring members are utilized to move the energy absorbing panel or panels rearwardly to their protective positions in the event of a collision. In FIGS. 6 and 7, a releasable locking assembly 200 is positioned rearwardly of the front bumper 210. As shown in FIG. 9, the locking assembly 200 comprises a deformable bracket member 202 which is fixed to the bumper 210 and engages an enlarged portion of the cross bar 204 connected to actuating rods 206 which are pivotally connected to an energy absorbing panel 222. A helical coil spring 208 surrounds a portion of each actuating rod 206 and has one end in engagement with a fixed portion 210 on the vehicle V'', through which the rod 206 extends, and the other end of the spring 208 is in engagement with a second flange 212 on the actuating rod 206. The coil springs 208, therefore, serve to urge the actuating rods 206 and the energy absorbing panel 222 connected thereto in a rearward direction, and this rearward movement of the rods 206 and panel 222 is prevented by the engagement of the deformable bracket 202 with the cross bar 204 connected to the rods 206. In the embodiment shown in FIGS. 6 and 7, the energy absorbing panel 222 is also pivotally connected to a link 214 which is pivotally connected at its other end to the seat or vehicle frame in any suitable manner.

In the operation of the embodiment shown in FIGS. 6 and 7, an impact on the front bumper 210 caused by a collision serves to force the front narrow portion 202a of the bracket 202 against a laterally extending rod 216 that is secured to the vehicle frame. The engagement of the narrow portion 202 with the rod 216 serves to deform the bracket 202 outwardly to the broken line position shown in FIG. 9 wherein the inwardly extending tabs 202b of the bracket 202 are moved outwardly beyond the cross bar 204 connected to the actuating rods 206. Since the bracket 202 no longer engages the cross bar 204, the springs 208 serve to move the actuating rods 206 and the energy absorbing panel 222 from the solid line position to the rearward broken line position shown in FIGS. 6 and 7, wherein the energy absorbing panel 222 is positioned closely adjacent to the upper torso of the occupant of the vehicle seat to restrain forward movement of the occupant and to prevent serious injury resulting from the collision.

Figure 8:
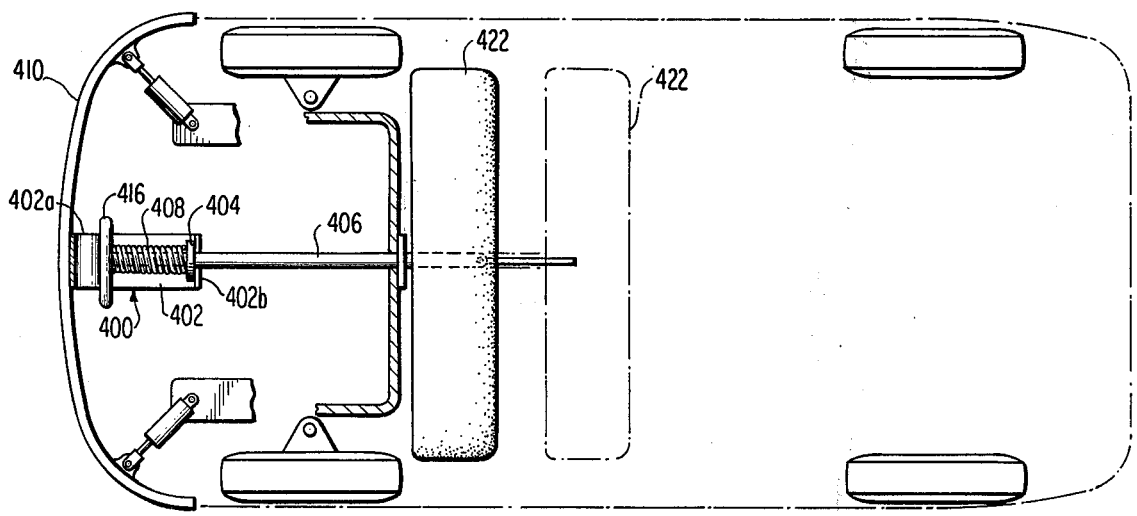
FIG. 8 is a plan view, with parts broken away, of a fourth embodiment of the vehicle safety apparatus of the present invention.

In the embodiment shown in FIG. 8, which is similar to the embodiment shown in FIGS. 6 and 7, the actuating spring 408 is disposed within the releasable locking device 400 and is in engagement with a flange 404 on a single actuating rod 406 that is connected to the energy absorbing panel 422. When the front bumper 410 is subjected to a frontial impact as a result of a collision, it moves rearwardly which causes the narrow portion 402a of bracket 402 to engage the cross bar 416 and to separate the portions of the bracket 402. This separation of the bracket 402 results in movement of the tabs 402b out of engagement with the flange 404 on the actuating rod 406, and allows the spring 408 to move the actuating rod 406 rearwardly. The rearward movement of the actuating rod 406 serves to move the energy absorbing panel 422 to the rear protective position shown in broken lines in FIG. 8 wherein it will restrain movement of the occupant or occupants of the vehicle to prevent serious injury as a result of the collision.

In the embodiments shown in FIGS. 6–8, a side impact on the front bumper will serve to move the tabs 202b or 402b laterally out of engagement with the enlarged portion of the cross bar 204 or the flange 404, thereby enabling the springs 208 or 408 to move the actuating rods 206 or 406 rearwardly and to also more the energy absorbing panel 222 or 422 rearwardly to the occupant protective position.

Figure 10:
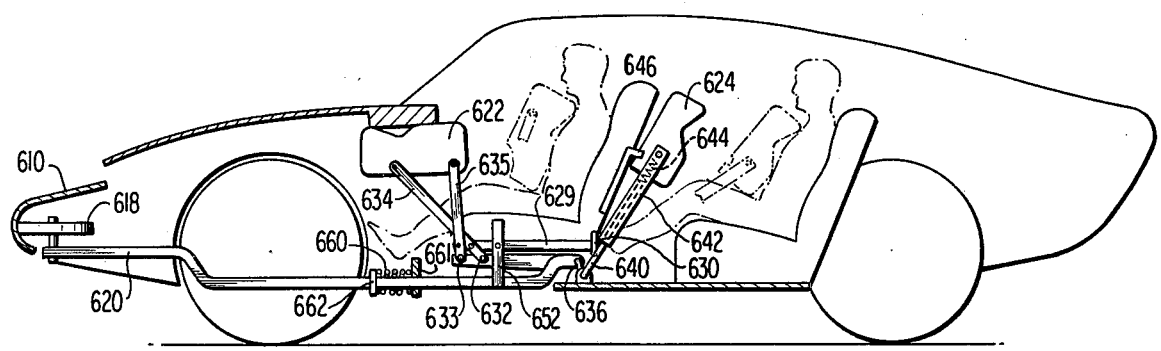
FIG. 10 is an elevational view, with parts broken away, of a fifth embodiment of the vehicle safety apparatus of the present invention.

A fifth embodiment of the vehicle safety apparatus of the present invention is shown in FIG. 10. This embodiment is similar to the embodiment shown in FIGS. 4 and 5 in that rearward movement of the bumper 610 in response to an impact causes rearward movement of the cam member 618 and the actuating rod or link 620 connected thereto. The actuating rod 602 extends rearwardly beneath the front seat and is pivotally connected at its rear end to a bell crank lever 636 that is pivotally supported on the vehicle frame. The bell crank lever 636 comprises upwardly extending arms 640 that are in telescoping relation with elongated tubes 642 in which helical coil springs 644 are positioned for the purpose of urging the elongated tubes upwardly and outwardly as shown in FIG. 10. The upper ends of the tubes 642 are connected to the rear energy absorbing panel 624, and the tubes 642 are maintained in the stored position shown in FIG. 10 against the force of the springs 644 by a retaining bracket 646 that is received in a complementary slot in the front of the panel 624.

Under the front seat, an adjustable positioning lever 652 is movably connected to the actuating rod 620. The lever 652 is adjustably connected near its upper end to a rod 629 which is mounted on the seat frame in any suitable manner for substantially horizontal sliding movement in forward and rearward directions. Links 634 and 635 are pivotally connected at their upper ends to the front energy absorbing panel 622, and are pivotally connected at their lower ends to the rod 629 and at 632 and 633 to the seat frame. A coil spring 660 is disposed between a portion of the vehicle frame 661 and a flange 662 on the actuating rod 620 for the purpose of urging the actuating rod 620 towards the front of the vehicle.

In the operation of the embodiment of the vehicle safety apparatus shown in FIG. 10, a front or side impact on the bumper 610 results in rearward movement of the cam member 618 and the actuating rod 620. This rearward movement of the rod 620 causes rearward movement of the rod 629, owing to the connection therebetween established by the lever 652, and results in clockwise rotation of the front energy absorbing panel 622 from the solid line to the broken line position shown in FIG. 10. The rearward movement of the rod 629 causes the links 634 and 635 to pivot in a clockwise direction, which in turn causes the above described clockwise rotation and rearward movement of the energy absorbing panel 622.

The rearward movement of the actuating rod 620 also causes the clockwise rotation of the rear energy absorbing panel 624 and its release from the locking bracket 646, thereby enabling the springs 644 to move the elongated tubes 642 and the panel 624 to the extended rearward position shown in broken lines in FIG. 10. In this position, the energy absorbing panel 624 serves to restrain forward movement of passengers in the rear seat of the vehicle to prevent fatal or serious injury to these passengers during a collision.

As shown in FIG. 10, the rod 629 may be provided with a foot pedal portion 630 which extends into the rear seat area. In this manner, after a collision has occurred, an occupant of the rear seat can push forwardly with his foot on the foot pedal 630 to disengage the lever 652 from the rod 620 in any suitable manner and to allow the rod 629 to move forwardly, which results in forward movement of the rear energy absorbing panel 624 to facilitate egress from the rear seat.

In a similar manner, an occupant of the front seat after a collision can release the rod 629 from the rod 620 by moving the lever 652 to a position wherein it is no longer connected to the rod 629 or to the rod 620. After the release of the rod 629 from the rod 620, the rod 629 can be moved forwardly so as to pivot the links 634 and 635 and the front energy absorbing panel 622 forwardly to facilitate egress from the front seat.

Figure 11:
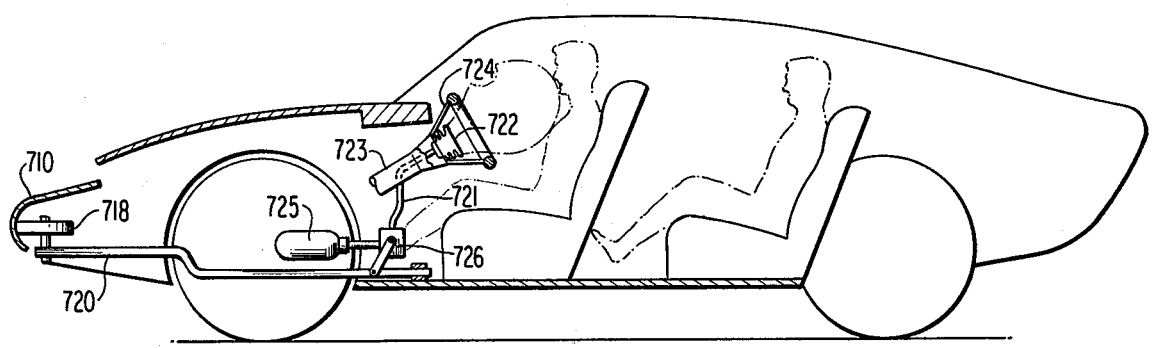
FIG. 11 is an elevational view, with parts broken away, of a sixth embodiment of the vehicle safety apparatus of the present invention.

In the use of the above described embodiments of the present vehicle safety apparatus for the protection of the driver rather than the passengers of a vehicle, it is contemplated that the conventional steering wheel would be replaced with a bar, stick or other steering device which would not interfere with the forward and rearward movement of the energy absorbing panel or panels. In the case of a vehicle with a conventional steering wheel, the driver could be protected in the manner shown in FIG. 11 wherein a flexible and resilient cushioning member or energy absorbing panel 722 is positioned in the center of the steering column 723 in the area where the horn actuating button is normally positioned. This energy absorbing panel 722 on the steering wheel 724 could be formed of any type of flexible and resilient material, or could be inflatable by any suitable device, such as a source of compressed air 725 which is normally cut-off by a valve 726 that is adapted to be opened by rearward movement of an actuating rod 720 connected to a cam member 718 which is moved rearwardly by an impact on the bumper 710, in the manner shown and described hereinbefore with respect to the various embodiments of the present invention. In operation, an impact on the front bumper 710 results in rearward movement of the actuating rod 720 which, in turn, causes the valve 726 to open and connect the compressed air or other pressure source 725 to the inflatable member 722 via the line 721, thereby inflating the member or bag 722 in the center portion of the steering column to cushion forward movement of the driver of the vehicle in the event of a collision. In addition, inflatable members rather than movable panels could be positioned in front of the passengers other than the driver, and could be inflated in the manner described above with respect to the member 722 for the protection of all of the passengers in the event of a collision.

What is claimed is:

1. Safety apparatus for a vehicle having a passenger seat, comprising an energy absorbing panel positioned in front of the seat and movably mounted on the vehicle for movement between a first position wherein said energy absorbing panel is spaced from the occupant of the seat and a second position wherein said energy absorbing panel is positioned closely adjacent to and in front of the occupant of the seat, bumper means movably mounted on the vehicle, a linkage connecting said bumper means to said energy absorbing panel, said linkage being operable to effect movement of said energy absorbing panel from said first position to said second position in response to inward movement of said bumper means caused by an impact thereon to restrain forward movement of the occupant of the seat before significant forward body movement of the occupant in response to the force of the impact, and means for retaining said energy absorbing panel in said second position during the impact.

2. The safety apparatus of claim 1 wherein said energy absorbing panel extends laterally in front of the passenger seat, said panel having a layer of energy absorbing material facing the passenger seat when in said second position.

3. The safety apparatus of claim 2 wherein said energy absorbing material is a plastic foam material.

4. The safety apparatus of claim 2 wherein said panel is a portion of the dashboard of the vehicle.

5. The safety apparatus of claim 2 wherein means are provided to pivotally support said panel on said vehicle, whereby said panel is pivotally movable from said first position wherein it is substantially horizontally disposed to said second position wherein it is substantially vertically disposed.

6. The safety apparatus of claim 1 wherein said bumper means comprises a bumper pivotally mounted on the vehicle.

7. The safety apparatus of claim 4 wherein said bumper is resiliently mounted on the front of the vehicle.

8. The safety apparatus of claim 4 wherein said bumper is mounted on the side of the vehicle.

9. The safety apparatus of claim 4 wherein said bumper means comprises a first bumper resiliently mounted on the front of the vehicle and second bumpers mounted on the sides of the vehicle.

10. The safety apparatus of claim 1 wherein said linkage is so connected to said bumper means and said energy absorbing panel that inward movement of said bumper means causes rearward movement of said linkage and rearward movement of said energy absorbing panel to said second position.

11. The safety apparatus of claim 9, further comprising means for releasably retaining said energy absorbing means in said second position, said releasable retaining means being manually releasable by the occupant of the seat.

12. The safety apparatus of claim 1 wherein said linkage comprises spring means for urging said energy absorbing means toward said second position, and means for normally holding said energy absorbing panel in said first position against the force of said spring means, said holding means being releasable in response to inward movement of said bumper means caused by an impact thereon, whereby said spring means moves said energy absorbing panel to said second position.

13. The safety apparatus of claim 1 wherein said vehicle has front and reaar passenger seats, and said energy absorbing means is positioned in front of the front and rear seats.

* * * * *